Nov. 18, 1924.
G. A. LUND
1,515,784
PROPELLER DRIVE
Filed Dec. 6, 1922       2 Sheets-Sheet 2
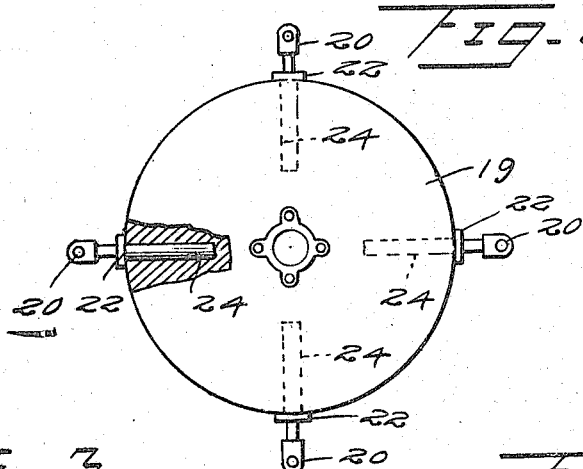
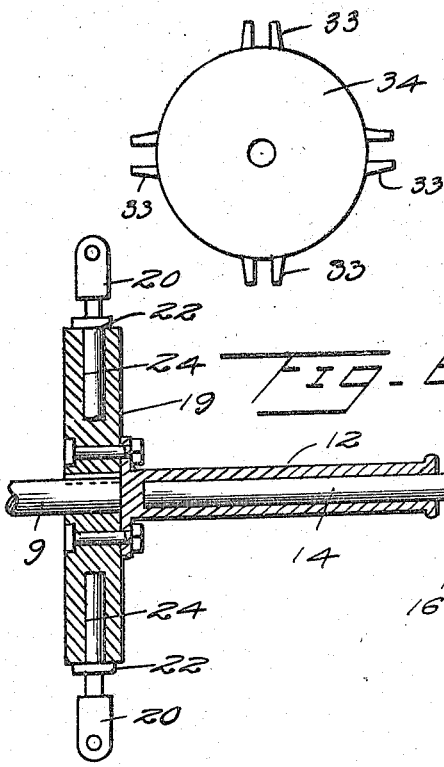
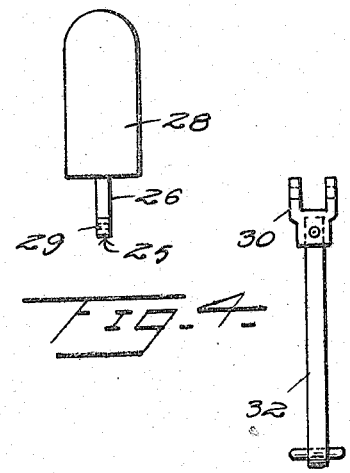
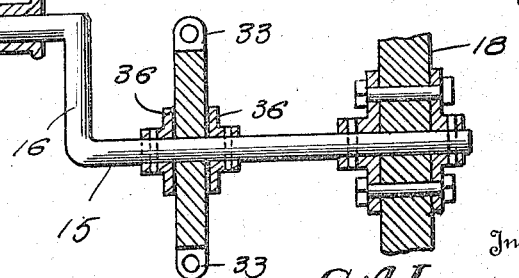
Inventor
G. A. Lund.
By William J. Jacobi
Attorney Patented Nov. 18, 1924.

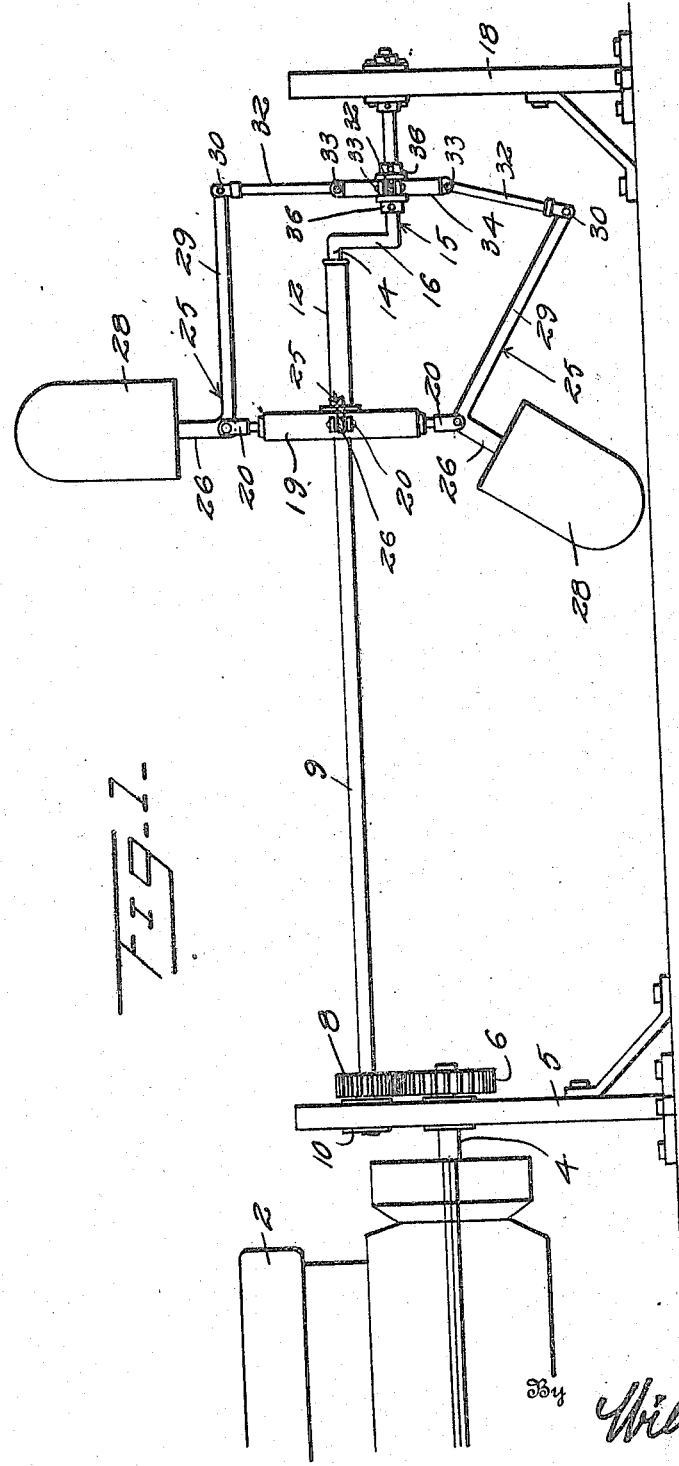

1,515,781

UNITED STATES PATENT OFFICE.

GUSTAF A. LUND, OF PESHTIGO, WISCONSIN.

PROPELLER DRIVE.

Application filed December 6, 1922. Serial No. 605,192.

*To all whom it may concern:*

Be it known that GUSTAF A. LUND, a citizen of the United States of America, residing at Peshtigo, in the county of Marinette and State of Wisconsin, has invented certain new and useful Improvements in Propeller Drives, of which the following is a specification.

This invention relates to a propeller attachment for aeroplanes and power boat propeller shafts and is designed with the purpose of providing an apparatus for modifying the speed of rotation of the shaft of an engine.

In the accompanying drawing;

Figure 1 is a side elevation of my invention as applied to use;

Figure 2 is an end elevation of one of the discs employed in the operating mechanism;

Figure 3 is a similar view of the disc which is carried by the fixed shaft, and

Figures 4, 5 are respectively elevations of details of construction.

Figure 6 is a sectional view of a detail.

Referring more particularly to the drawings by numerals of reference, 2 designates an engine of the type usually employed as the power plant of a motor boat or aeroplane, the drive shaft of which is shown at 4 and which is journalled at each end in suitable bearing boxes provided in the vertical supporting standards 5.

That end of the motor drive shaft, which for purposes of illustration I shall refer to as the rear, extends thru its bearing and is provided with a gear or cog wheel 6 in mesh with a similar gear 8 keyed on a rotary shaft 9 vertically offset from the engine shaft 4 and journalled at its forward end in a suitable bearing box 10 in the rear vertical supporting standard 5.

The rear end of the shaft 9 is tubular in form so as to provide a sleeve 12, which telescopes over the forward end 14, of a shaft 15, the portion 14 being laterally offset from the said shaft 15 thru an integral arm 16. The shaft 15 is rigidly secured at its rear end in a vertical support 18.

Keyed to, or otherwise fixed on, and for rotation with the shaft 9, is a disk 19, around the periphery of which is secured and spaced at 90 degrees angles, four yokes 20 swiveled at 22 in radial sockets 24. Pivotally mounted in the arms of each yoke 20 at the point of its angle is a bell-crank lever 25, the short or radial arm 26 of which carries a weight 28, while the longer or horizontal arm 29 is pivotally connected at its rear or free end with a yoke 30 swivelled in the outer end of a rigid link or rod 32.

The inner end of each of said links or rods is connected at 33 with the periphery of a disc 34 rotatable on the fixed shaft 15, and restrained thereon against longitudinal movement with respect to said shaft 15 thru the medium of stop-collars 36.

In the operation of the invention it will be observed that the weights 28 are drawn closer to the shaft 9 than when they reach a position above the same and consequently as they successively approach the last mentioned position they will overbalance the weight directly below the same and give an impelling force on the shaft 9. In other words, the distance between the shaft 9 and the weights 28 is greater when in their uppermost position than when in their lowermost position. This provides an increased leverage when in the uppermost position and thereby overbalances the weight directly beneath the shaft due to the decrease of the leverage of the latter weight with respect to the shaft.

What I claim and desire to protect by Letters Patent is:—

1. In an apparatus as described, a motor, a rotatable shaft driven thereby, a plurality of weights, means for pivotally mounting said weights on said rotatable shaft to turn therewith, and means for causing said weights to approach the axis of said shaft during a portion of their cycle.

2. In an apparatus as described, a motor, a rotatable shaft driven thereby, a fixed shaft associated with said rotatable shaft, a plurality of weights pivotally mounted on said rotatable shaft, and means on said fixed shaft for causing said weights to approach the axis of said rotatable shaft during a portion of their cycle.

3. In an apparatus as described, a motor, a rotatable shaft driven thereby, a fixed shaft associated with said rotatable shaft, a plurality of weights pivoted for longitudinal movement on said rotatable shaft, a disc on said fixed shaft and connections between said weights and said disc for causing said weights to approach the axis of said rotatable shaft during a portion of their cycle.

4. In an apparatus as described, a motor, a rotatable shaft driven thereby, a disc fixed on said rotatable shaft, a plurality of pivoted and longitudinally swinging bell-crank levers on said disc, a weight fixed on the outer short arm of said lever, a fixed shaft associated with said rotatable shaft and having an offset member in axial alinement with said rotatable shaft, a disc on the fixed shaft, and a link connecting the other and long arm of said bell-crank lever with said fixed disc for causing said weights to approach the axis of said rotatable shaft during a portion of their cycle.

In testimony whereof I affix my signature.

GUSTAF A. LUND.